(12) United States Patent
Kurita

(10) Patent No.: US 11,101,606 B2
(45) Date of Patent: Aug. 24, 2021

(54) CHARGING INLET

(71) Applicant: Sumitomo Wiring Systems, LTD., Yokkaichi (JP)

(72) Inventor: Atsushi Kurita, Yokkaichi (JP)

(73) Assignee: SUMITOMO WIRING SYSTEMS, LTD., Yokkaichi (JP)

(*) Notice: Subject to any disclaimer, the term of this patent is extended or adjusted under 35 U.S.C. 154(b) by 0 days.

(21) Appl. No.: 16/633,310

(22) PCT Filed: Jul. 23, 2018

(86) PCT No.: PCT/JP2018/027434
§ 371 (c)(1),
(2) Date: Jan. 23, 2020

(87) PCT Pub. No.: WO2019/026660
PCT Pub. Date: Feb. 7, 2019

(65) Prior Publication Data
US 2020/0153173 A1    May 14, 2020

(30) Foreign Application Priority Data

Aug. 2, 2017   (JP) .............................. JP2017-149924

(51) Int. Cl.
*H01R 13/688*   (2011.01)
*H01H 85/04*    (2006.01)
(Continued)

(52) U.S. Cl.
CPC .......... *H01R 13/688* (2013.01); *H01H 85/04* (2013.01); *H01H 85/205* (2013.01); *H01R 13/5219* (2013.01); *H01H 2085/208* (2013.01)

(58) Field of Classification Search
CPC .. H01R 13/688; H01R 13/5219; H01H 85/04; H01H 85/205
(Continued)

(56) References Cited

U.S. PATENT DOCUMENTS 8,052,481 B2 * 11/2011 Azad ................... H01H 85/202
439/676
9,124,021 B2 * 9/2015 Kashiwada ............ H01R 13/73
(Continued)

FOREIGN PATENT DOCUMENTS

CN        101453089 A    6/2009
JP        2011222398 A   11/2011
(Continued)

OTHER PUBLICATIONS

PCT/JP2018/027434. International Search Report & Written Opinion (dated Feb. 7, 2019). 6 Pages.

*Primary Examiner* — Alexander Gilman
(74) *Attorney, Agent, or Firm* — Loza & Loza, LLP

(57) ABSTRACT

A charging inlet includes an accommodation box and an inlet body to which the accommodation box is attached from a rear side. The accommodation box includes multiple terminals, an accommodation box body separately accommodating the terminals, multiple fuses, a fuse box integrated with the accommodation box body and separately accommodating the fuses, and multiple bus bars respectively electrically connecting the terminals to the fuses. The accommodation box body has a circular columnar shape and extends in a front-rear direction. The accommodation box includes multiple body receptacles that are open in a front end surface of the accommodation box to separately accommodate the terminals. The terminals accommodated in the body receptacles project from a front end surface of the accommodation box body. The bus bars are embedded into the accommodation box.

3 Claims, 9 Drawing Sheets

(51) Int. Cl.
*H01H 85/20* (2006.01)
*H01R 13/52* (2006.01)

(58) Field of Classification Search
USPC .......................................................... 439/620
See application file for complete search history.

(56) References Cited

U.S. PATENT DOCUMENTS

| | | | | |
|---|---|---|---|---|
| 10,218,130 B1* | 2/2019 | Jung | ................... | H01H 85/202 |
| 10,511,129 B1* | 12/2019 | Jung | ................. | H01R 13/5202 |
| 10,910,736 B2* | 2/2021 | Kurita | ..................... | H02G 3/16 |
| 2008/0242150 A1* | 10/2008 | Chikamatsu | ........... | H01H 85/54 |
| | | | | 439/620.3 |
| 2009/0149048 A1* | 6/2009 | Pavlovic | ............... | B60L 3/0069 |
| | | | | 439/181 |
| 2011/0306221 A1* | 12/2011 | Kamo | ................ | H01R 13/696 |
| | | | | 439/76.2 |
| 2012/0064771 A1* | 3/2012 | Urrea | ................... | H01H 85/205 |
| | | | | 439/620.29 |
| 2012/0094537 A1* | 4/2012 | Aoki | .................... | H01R 13/688 |
| | | | | 439/620.26 |
| 2014/0038463 A1* | 2/2014 | Natter | .................... | B60L 53/65 |
| | | | | 439/620.34 |
| 2014/0120767 A1* | 5/2014 | Itsuki | ................. | H01R 13/5202 |
| | | | | 439/587 |
| 2015/0229055 A1* | 8/2015 | Fukushima | ............. | B60L 53/16 |
| | | | | 439/733.1 |
| 2016/0233625 A1* | 8/2016 | Kato | .................... | H01R 13/688 |
| 2018/0248275 A1* | 8/2018 | Morita | .................... | H01R 4/34 |
| 2020/0153173 A1* | 5/2020 | Kurita | .................... | B60L 53/16 |

FOREIGN PATENT DOCUMENTS

| | | |
|---|---|---|
| JP | 2016046180 A | 4/2016 |
| WO | 2013176139 A1 | 11/2013 |

* cited by examiner

CHARGING INLET

BACKGROUND

Field of the Disclosure

The present disclosure relates to a charging inlet.

Related Art

Japanese Laid-Open Patent Publication No. 2016-46180 describes an example of a prior art charging inlet. The charging inlet is used when charging an electric automobile or the like and engages a charging connector. The charging inlet includes five accommodation cylinders that accommodate terminals. The five accommodation cylinders separately accommodate two power terminals, one ground terminal, and two signal terminals.

Each terminal includes a circular columnar body elongated in a front-rear direction, a round pin projecting from the front end of the body toward the front side, and a wire connector extending from the rear end of the body toward the rear side. The wire connector is closed-barrel-shaped. The conductive core of a wire is fastened to the wire connector through crimping.

Wires connected to the two power terminals are typically connected to an end of one of two fuses. The two fuses are typically accommodated in a fuse box. The fuse box includes wire through holes, through which the two wires connected to the two power terminals are inserted. Waterproof seals are attached to the walls defining the wire through holes.

Since the wires connecting the two power terminals to the two fuses and the waterproof seals attached to the walls of the fuse box defining the two wire through holes are needed, the number of components is increased. In addition, the need for the task of connecting the two power terminals to the two fuses with wires increases the amount of assembly work.

SUMMARY

The present description discloses a charging inlet that includes an accommodation box and an inlet body to which the accommodation box is attached from a rear side. The accommodation box includes multiple terminals, an accommodation box body separately accommodating the terminals, multiple fuses, a fuse box integrated with the accommodation box body and separately accommodating the fuses, and multiple bus bars respectively electrically connecting the terminals to the fuses. The accommodation box body has a circular columnar shape and extends in a front-rear direction. The accommodation box includes multiple body receptacles that are open in a front end surface of the accommodation box to separately accommodate the terminals. The terminals accommodated in the body receptacles project from a front end surface of the accommodation box body. The bus bars are embedded into the accommodation box.

In the configuration described above, the multiple terminals are separately connected to the multiple fuses with the bus bars. This eliminates the need for typical wires connecting multiple terminals to multiple fuses. Thus, the number of components is reduced. Also, a typical task of connecting multiple terminals to multiple fuses with wires does not have to be performed. Thus, the amount of assembly work is reduced.

The configuration may further include a fuse cover covering the fuse box and a seal member disposed between an inner surface of the fuse cover and an outer surface of the fuse box to collectively seal an inner portion of the fuse box.

In the configuration described above, the seal member is disposed between the inner surface of the fuse cover and the outer surface of the fuse box to collectively seal the multiple fuses separately accommodated in the fuse box. Thus, the number of seal members is reduced as compared to a typical configuration in which seal members are separately attached to each fuse.

The charging inlet disclosed in the present description reduces the number of components and the amount of assembly work.

DETAILED DESCRIPTION

Figure 1:
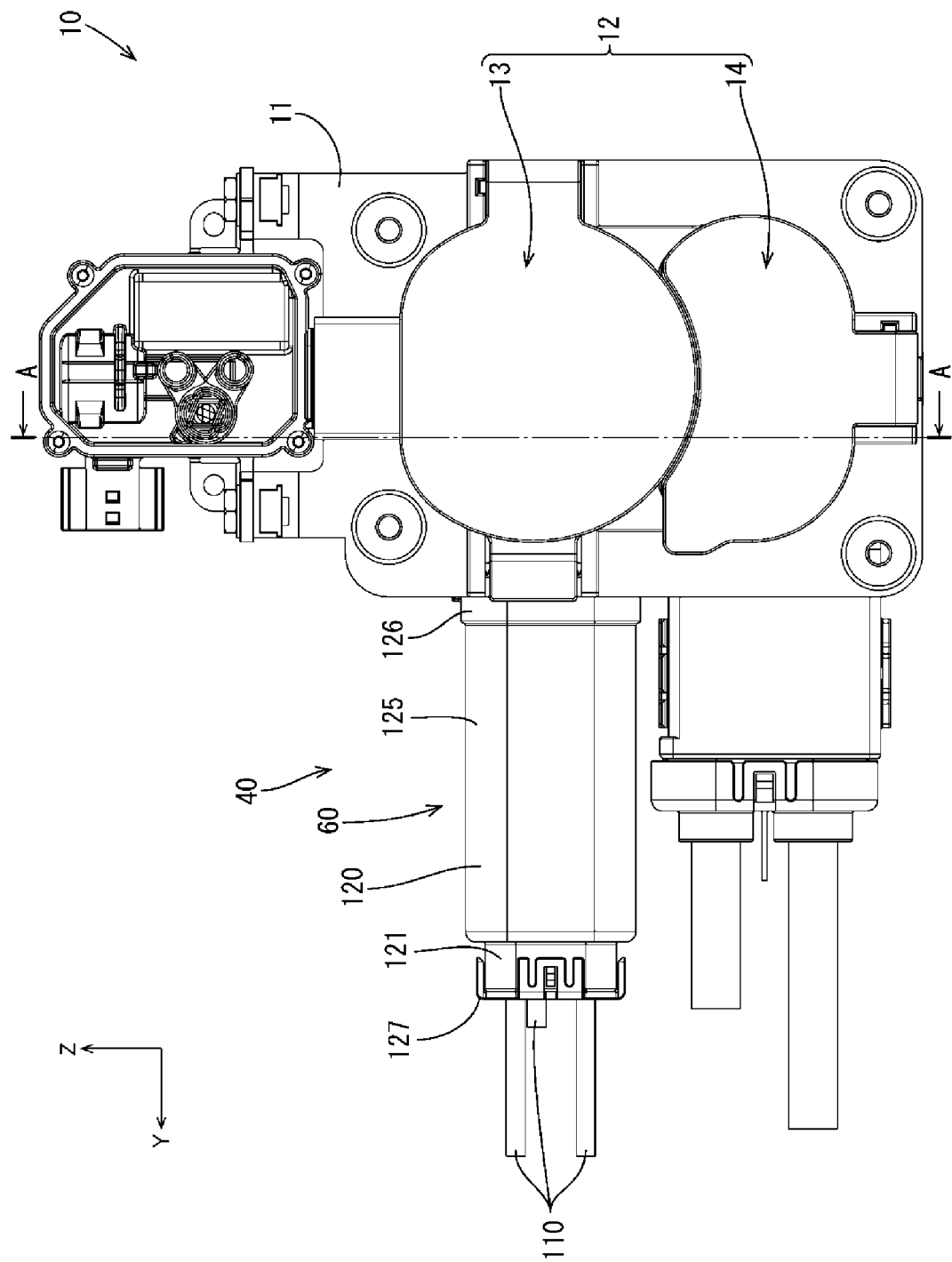
FIG. 1 is a front view of a charging inlet.

The present embodiment will now be described with reference to FIGS. 1 to 9.

The present embodiment of a charging inlet 10 is used to charge an electric vehicle or the like and is coupled to the vehicle side. A charging connector, which is not shown in the drawings, is connected to the charging inlet 10. In the description hereafter, the Z-direction, the X-direction, and the Y-direction shown in FIGS. 1 to 4 respectively refer to the upper side, the front side, and the right side.

Figure 5:
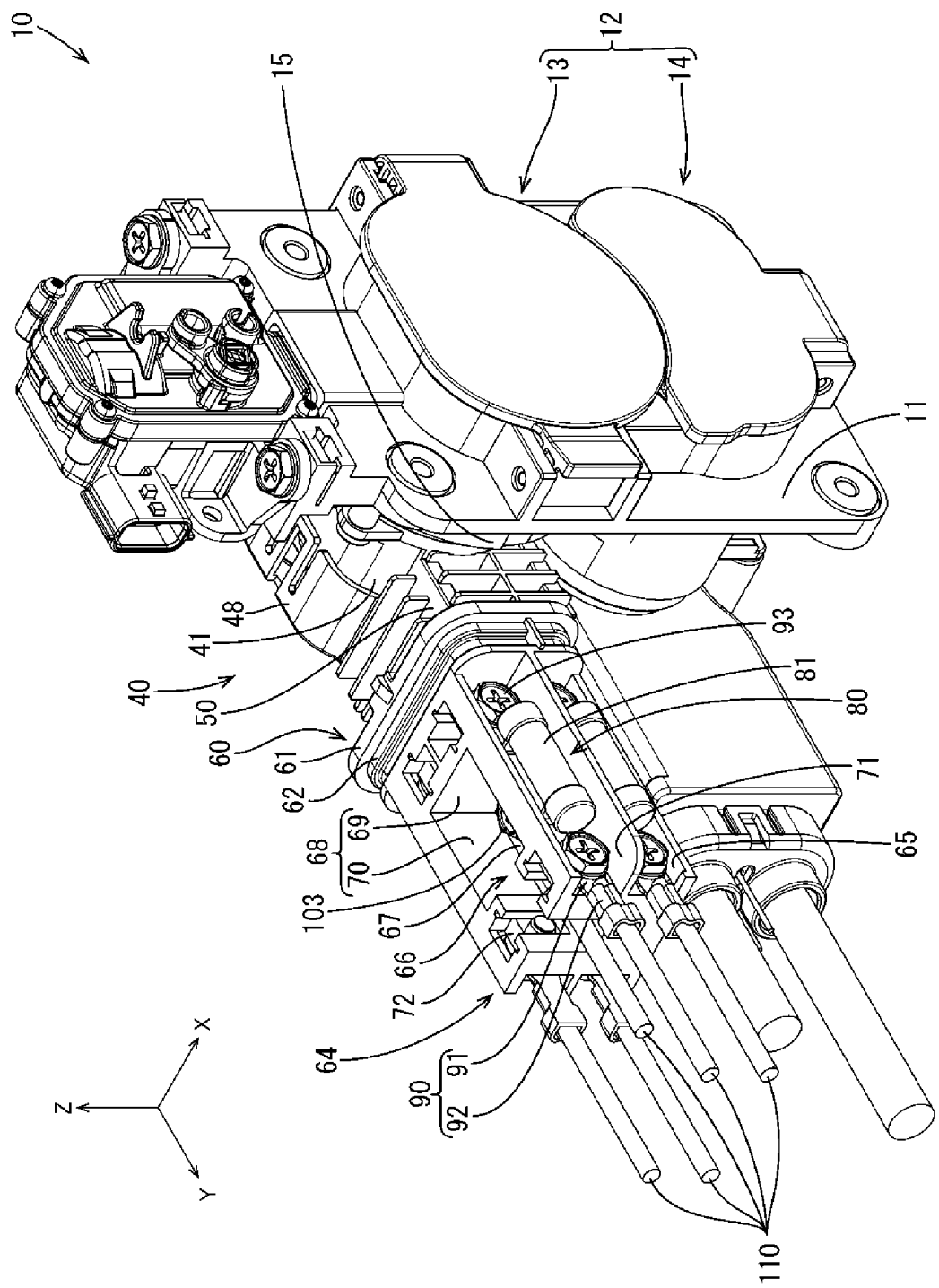
FIG. 5 is a perspective front view of the charging inlet with a fuse cover removed.
Figure 6:
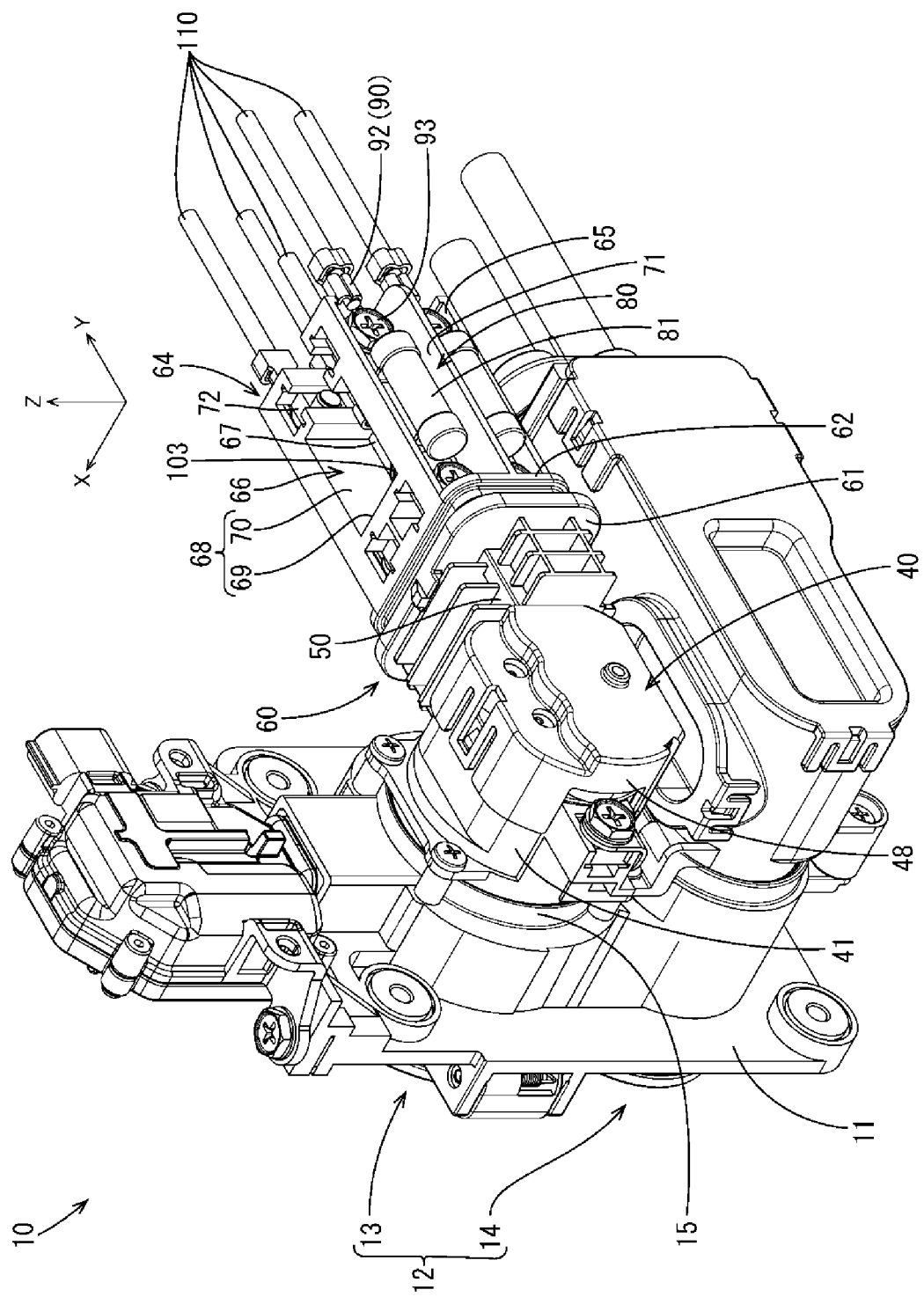
FIG. 6 is a perspective rear view of the charging inlet with the fuse cover removed.

As shown in FIGS. 5 and 6, the charging inlet 10 is of an integration type that integrates normal charging and fast charging. The charging inlet 10 includes a flat plate 11, which may have a rectangular plate shape, and an inlet body 12. The inlet body 12 includes a normal charging unit 13 and a fast charging unit 14. The normal charging unit 13 is disposed on an upper portion of the flat plate 11. The fast charging unit 14 is disposed on a lower portion of the flat plate 11.

As shown in FIGS. 5 and 6, the normal charging unit 13 has a circular columnar shape and projects from the flat plate 11 in the front-rear direction. A circular cylindrical projection 15 having the shape of a circular cylinder projects from the rear surface of the normal charging unit 13 toward the rear side. An accommodation box 40 is attached to the normal charging unit 13 from the rear side. The accommodation box 40 accommodates four power-side first terminals 20, one ground-side second terminal 30, and four fuses 80.

Figure 7:
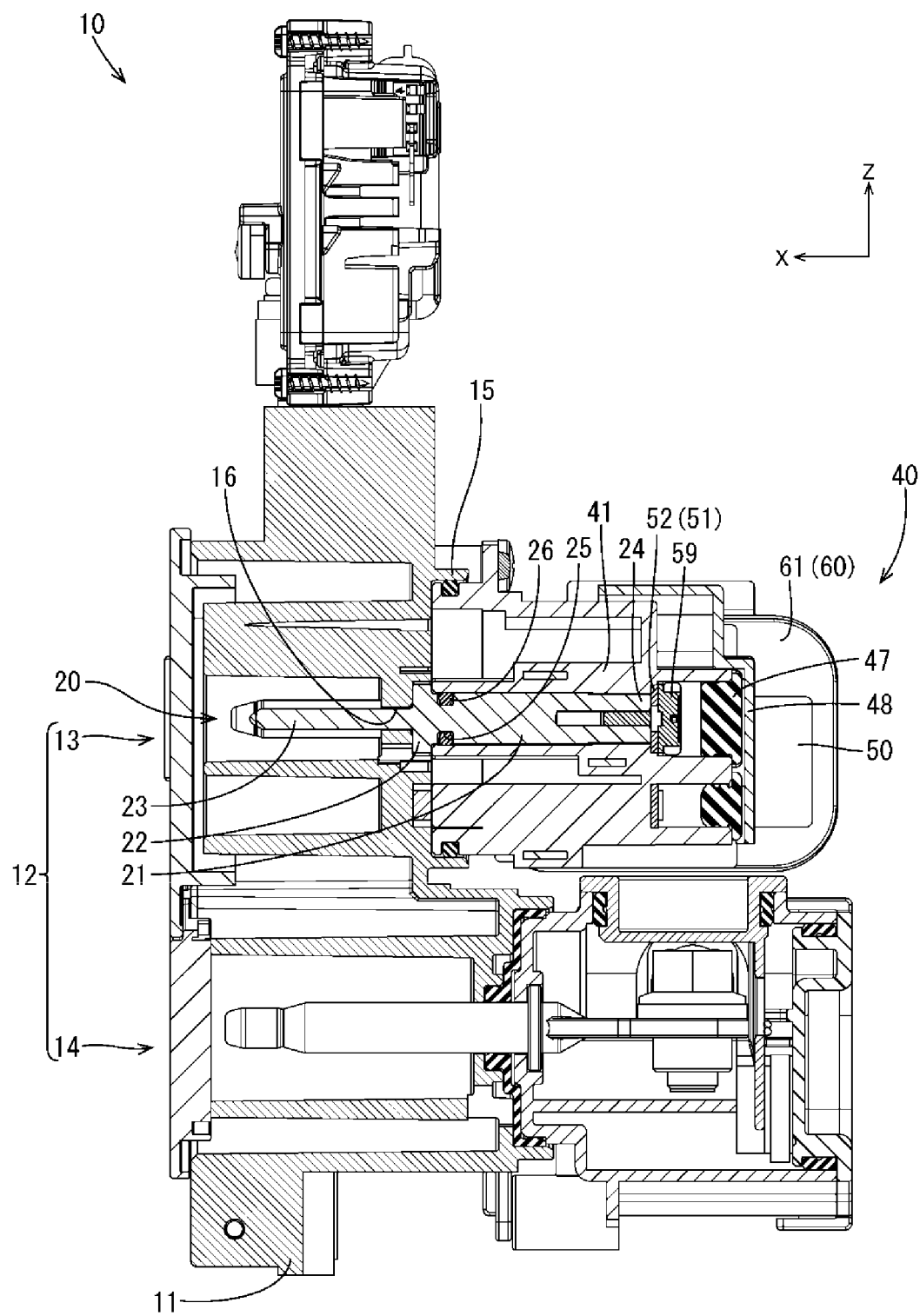
FIG. 7 is a cross-sectional view taken along line A-A in FIG. 1.
Figure 9:
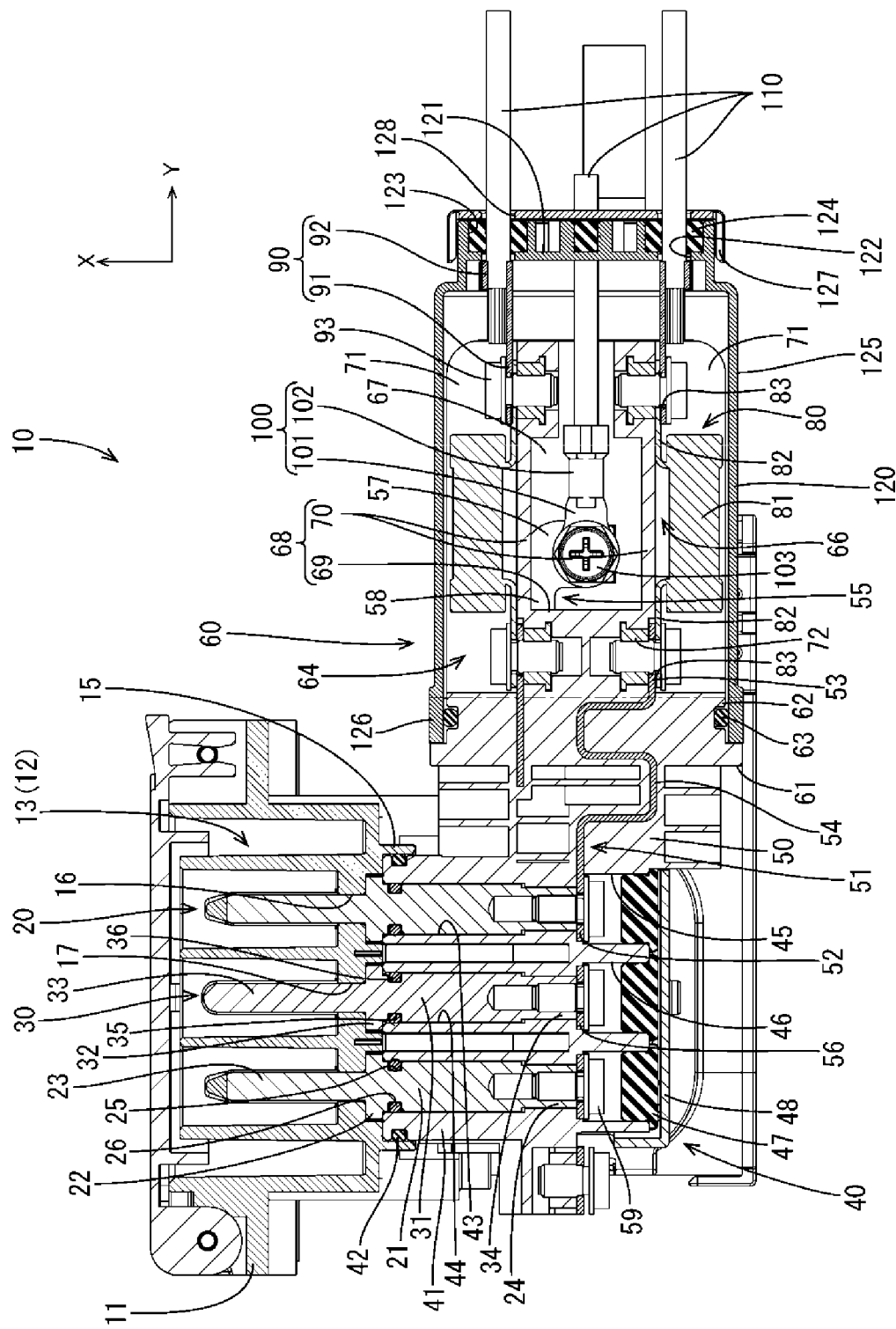
FIG. 9 is a cross-sectional view taken along line C-C in FIG. 2.

As shown in FIGS. 7 and 9, each first terminal 20 includes a first body 21 extending in the front-rear direction, a first flange 22 extending around on the front end portion of the first body 21, a pin-shaped first terminal connector 23 projecting from the front end surface of the first body 21 toward the front side, and a first fastening portion 24 projecting from the rear end surface of the first body 21. The first fastening portion 24 has an inner part having a threaded hole configured to engage a bus bar fastening screw 59. The first body 21 includes a groove-shaped first recess 25 at a slightly rear side of the first flange 22. A first rubber ring 26 is fitted into the first recess 25.

Figure 8:
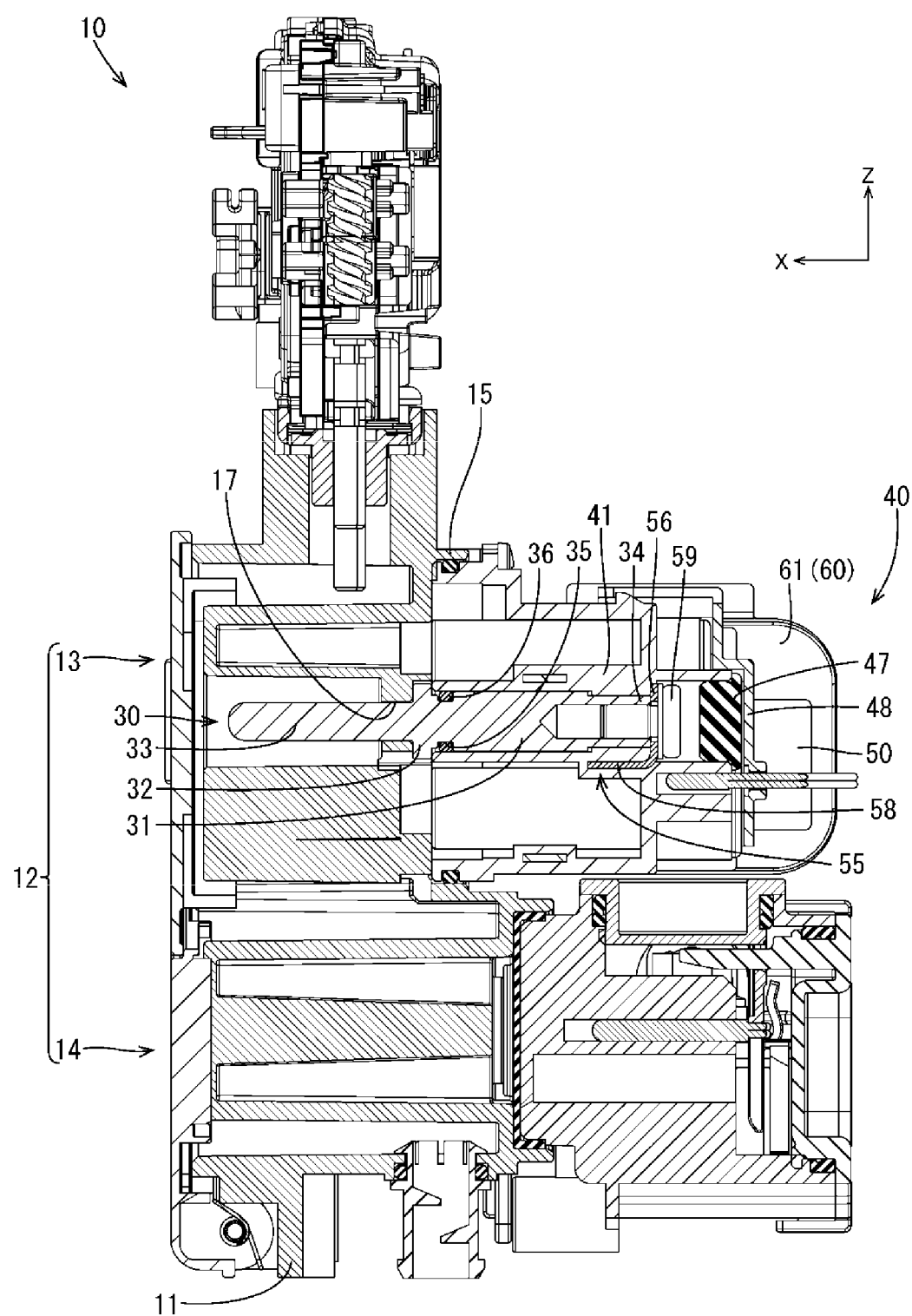
FIG. 8 is a cross-sectional view taken along line B-B in FIG. 2.

As shown in FIGS. 8 and 9, the second terminal 30 includes a second body 31 extending in the front-rear direction, a second flange 32 extending around on the front end portion of the second body 31, a second terminal connector 33 having the shape of a round rod and projecting from the front end surface of the second body 31 toward the front side, and a second fastening portion 34 projecting from the rear end surface of the second body 31. The second fastening portion 34 has an inner part having a threaded hole configured to engage a bus bar fastening screw 59. The second body 31 includes a groove-shaped second recess 35 at a slightly rear side of the second flange 32. A second rubber ring 36 is fitted into the second recess 35.

As shown in FIG. 9, the accommodation box 40 includes an accommodation box body 41, a fuse box 60, and a joint portion 50 joining the accommodation box body 41 and the fuse box 60.

Figure 2:
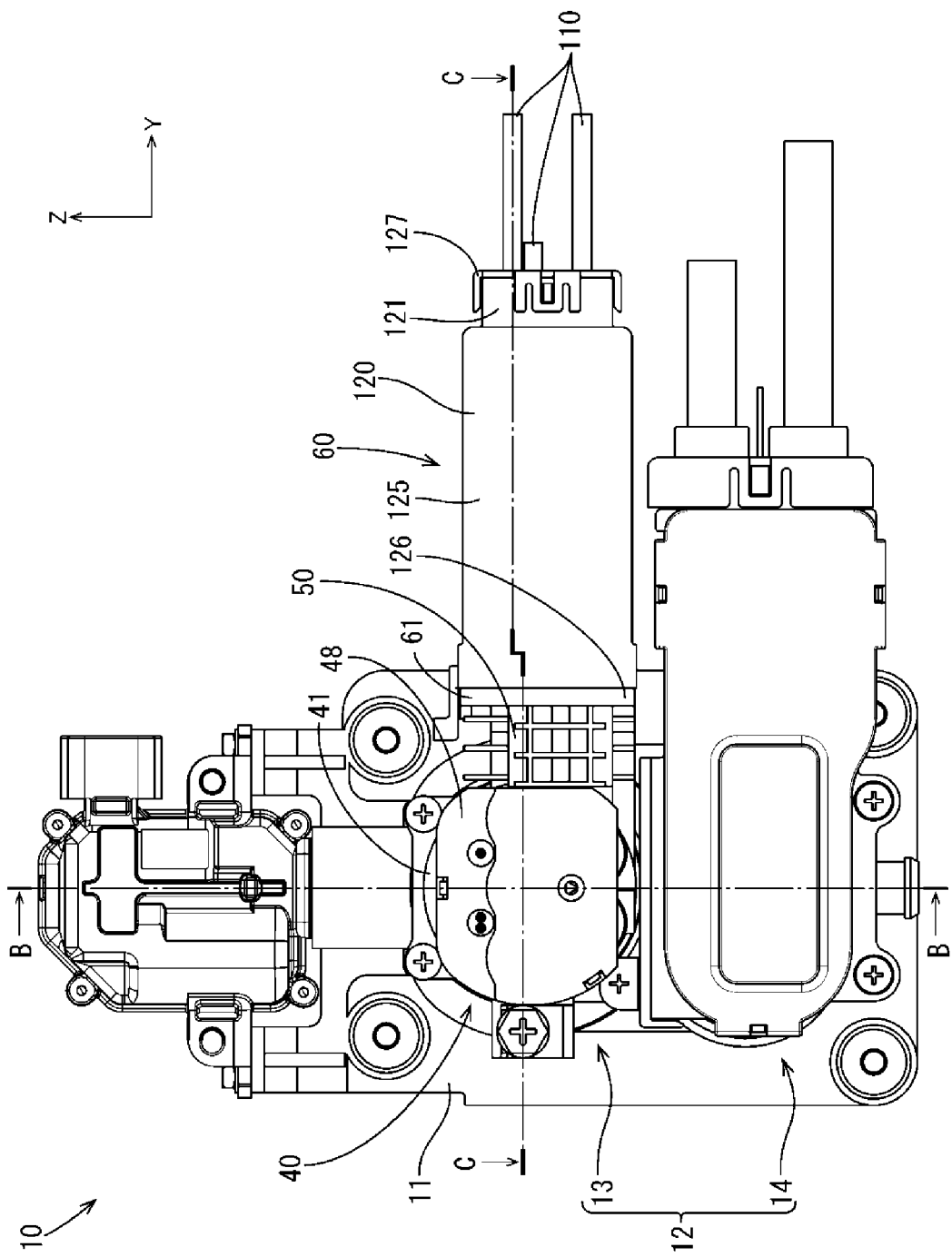
FIG. 2 is a rear view of the charging inlet.
Figure 3:
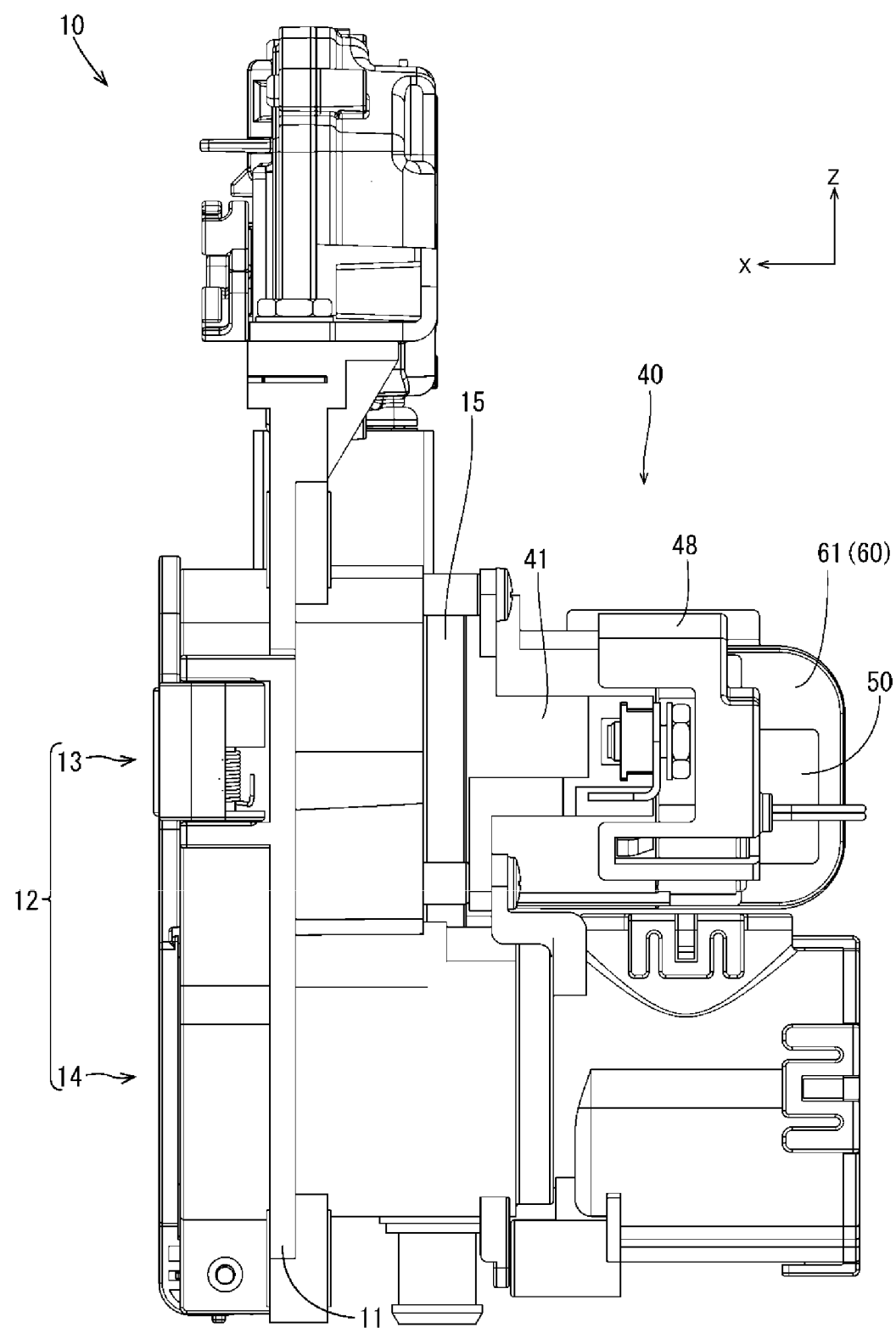
FIG. 3 is a right view of the charging inlet.

As shown in FIGS. 2 and 6, the accommodation box body 41 has a circular columnar shape and extends in the front-rear direction. The circumferential surface of the accommodation box body 41 includes a groove into which a body rubber ring 42 is fitted. As shown in FIG. 9, when the accommodation box 40 is attached to the normal charging unit 13, the inner surface of the circular cylindrical projection 15 of the normal charging unit 13 is in contact with the body rubber ring 42 of the accommodation box body 41. This prevents entrance of water into the normal charging unit 13.

The accommodation box body 41 includes four first body receptacles 43 and one second body receptacle 44 that are open in the front end surface of the accommodation box body 41. Two of the four first body receptacles 43 are not shown in FIG. 9. The remaining two of the first body receptacles 43 are shown in FIG. 9 and are disposed in the accommodation box body 41 and separated from each other by a fixed distance in the sideward direction. The second body receptacle 44 is disposed between the two first body receptacles 43.

The accommodation box body 41 includes first screw through holes 45 and a second screw through hole 46 that are open in the rear end surface of the accommodation box body 41. The inner cavity of the first body receptacle 43 is connected to the inner cavity of the first screw through hole 45. Also, the inner cavity of the second body receptacle 44 is connected to the inner cavity of the second screw through hole 46. The inner diameter of the first screw through hole 45 is greater than the inner diameter of the first body receptacle 43. Also, the inner diameter of the second screw through hole 46 is greater than the inner diameter of the second body receptacle 44.

The four first body receptacles 43 respectively accommodate the first bodies 21 of the first terminals 20. As shown in FIG. 9, the first flange 22 of each first terminal 20 is in contact with the front open edge of the first body receptacle 43. This prevents the first terminal 20 from separating from the first body receptacle 43 toward the rear side. The first rubber ring 26, which is fitted into the first recess 25, is in contact with an inner portion of the first body receptacle 43. This prevents entrance of water into the first body receptacle 43 from the front side of the first body receptacle 43.

The second body receptacle 44 accommodates the second body 31 of the second terminal 30. As shown in FIG. 9, the second flange 32 of the second terminal 30 is in contact with the front open edge of the second body receptacle 44. This prevents the second terminal 30 from separating from the second body receptacle 44 toward the rear side. The second rubber ring 36, which is fitted into the second recess 35, is in contact with an inner portion of the second body receptacle 44. This prevents entrance of water into the second body receptacle 44 from the front side of the second body receptacle 44.

As shown in FIG. 9, the normal charging unit 13 includes first terminal through holes 16 and a second terminal through hole 17 that are open in the rear end surface of the normal charging unit 13. The first terminal connectors 23 of the first terminals 20 are inserted through the first terminal through holes 16. The second terminal connector 33 of the second terminal 30 is inserted through second terminal through hole 17. When the accommodation box body 41 is attached to the normal charging unit 13, the first terminal connectors 23 and the second terminal connector 33 projecting from the front end surface of the accommodation box body 41 are inserted through the first terminal through holes 16 and the second terminal through hole 17, respectively.

As shown in FIG. 9, rubber plugs 47 are attached to the first screw through holes 45 from the rear side. This prevents entrance of water into the first body receptacles 43 from the rear side. A rubber plug 47 is also attached to the second screw through hole 46. This prevents entrance of water into the second body receptacle 44 from the rear side. In addition, a body-side retainer 48 is attached to the accommodation box body 41 from the rear side, and prevents the rubber plugs 47 from separating toward the rear side.

As shown in FIG. 9, the joint portion 50 projects from a side surface of the accommodation box body 41 toward the right side. Four first bus bars 51 and one second bus bar 55 are embedded into the joint portion 50 and the fuse box 60, which will be described later, through insert molding. The four first bus bars 51 and the one second bus bar 55 are disposed so as not to contact each other.

As shown in FIG. 9, each first bus bar 51 includes a first terminal fastening portion 52 fastened to the first fastening portion 24 of the first terminal 20, a fuse fastening portion 53 fastened to the fuse 80, which will be described later, and a first bus bar body 54 joining the first terminal fastening portion 52 and the fuse fastening portion 53.

The second bus bar 55 includes a second terminal fastening portion 56 fastened to the second fastening portion 34 of the second terminal 30, a ground fastening portion 57 fastened to a second eyelet terminal 100 that is connected to a wire 110, which will be described later, and a second bus bar body 58 joining the second terminal fastening portion 56 and the ground fastening portion 57.

FIG. 9 shows one of the four first bus bars 51 having the first bus bar body 54 extending from the joint portion 50 toward the first fastening portion 24 of the first terminal 20 located at the right end. The first terminal fastening portion 52 located at the distal end of the first bus bar body 54 is disposed on the rear end portion of the first fastening portion 24 of the first terminal 20 located at the right end. Although not shown in the drawing, the first terminal fastening portions 52 of the remaining three first bus bars 51 and the second terminal fastening portion 56 of the second bus bar 55 are disposed in the same manner on the rear end portions of the first fastening portions 24 of the remaining three first terminals 20 and the rear end portion of the second terminal fastening portion 56.

As shown in FIG. 9, the first fastening portions 24 of the first terminals 20 are fastened to the first terminal fastening portions 52 of the first bus bars 51 with the bus bar fastening screws 59. Thus, the first terminals 20 are electrically conductive to the first bus bars 51. Also, the second fastening portion 34 of the second terminal 30 is fastened to the second terminal fastening portion 56 of the second bus bar 55 with the bus bar fastening screw 59. Thus, the second terminal 30 is electrically conductive to the second bus bar 55.

As shown in FIG. 9, the fuse box 60 projects from the right end of the joint portion 50 toward the right side and includes a box basal end 61, a collective seal 62, a fuse receptacle 64, and a fuse cover 120.

As shown in FIGS. 5 and 6, the box basal end 61 has the shape of a tetragonal plate having round corners and is continuous with the right end of the joint portion 50. The collective seal 62 projects from the right end of the box basal end 61 toward the right side. As shown in FIG. 9, the peripheral surface of the collective seal 62 includes a groove to which an annular seal member 63 is attached.

The fuse receptacle 64 projects from the right surface of the collective seal 62 toward the right side. The fuse receptacle 64 separately accommodates the four fuses 80 and the ground fastening portion 57 of the second bus bar 55.

As shown in FIGS. 5, 6, and 9, each fuse 80 includes a circular cylindrical fuse body 81 extending in the sideward direction and two lead portions 82 extending in the sideward directions from portions close to the left and right ends of the fuse body 81. Each of the two lead portions 82 includes a lead fastening hole 83 that is open in the distal end of the lead portion 82.

As shown in FIGS. 5 and 6, the four fuses 80 are separated into two rows in the front-rear direction and two rows in the vertical direction in the fuse receptacle 64. The fuses 80 in the two front-rear rows are arranged so that the lead fastening holes 83 of the fuses 80 are opposed to each other.

As shown in FIGS. 5, 6, and 9, the ground fastening portion 57 of the second bus bar 55 is disposed between the fuses 80 that are in the two front-rear rows and between the fuses 80 that are in the two vertical rows.

The fuse receptacle 64 includes a box bottom portion 65, a ground receptacle 66, and two vertical partition plates 71.

As shown in FIGS. 5, 6, and 9, the box bottom portion 65 projects from the lower portion of the right surface of the collective seal 62 toward the right side. The box bottom portion 65 is disposed at a lower side of the fuses 80 that are in the lower two rows.

As shown in FIGS. 5, 6, and 9, the ground receptacle 66 includes a ground seat 67 and a ground surrounding wall 68. The ground seat 67 extends from the left end to the right end of the upper surface of the box bottom portion 65 and projects from the upper surface toward the upper side. The ground surrounding wall 68 projects from the upper surface of the ground seat 67 toward the upper side and includes a left ground wall 69 located at the left of the ground fastening portion 57 and two side ground walls 70 located at the front and rear of the ground fastening portion 57. Although not shown in the drawings, the ground seat 67 embeds a ground fastening nut, and the ground fastening portion 57 of the second bus bar 55 is coaxial with the ground fastening nut.

As shown in FIG. 9, the ground fastening portion 57 of the second bus bar 55 is fastened to the second eyelet terminal 100. The second eyelet terminal 100 includes a second eyelet terminal fastening portion 101 and a second wire crimping portion 102. A fastening hole is open in the second eyelet terminal fastening portion 101. The second wire crimping portion 102 is of a closed barrel type and is connected to the conductive core of a wire 110 through crimping. The second eyelet terminal fastening portion 101 is disposed on the ground fastening portion 57 of the second bus bar 55. A ground fastening bolt 103 is inserted through the second eyelet terminal fastening portion 101 and the ground fastening portion 57 of the second bus bar 55. The ground fastening bolt 103 engages the ground fastening nut (not shown) embedded into the ground seat 67. Thus, the second terminal 30 and the second eyelet terminal 100 are electrically connected via the second bus bar 55. The wire 110 connected to the second wire crimping portion 102 extends toward the right side and is routed to be connected to a ground, which is not shown.

As shown in FIGS. 5 and 6, the two vertical partition plates 71 project from the right surface of the collective seal 62 toward the right side. The two vertical partition plates 71 are separated from each other by a fixed distance in the front-rear direction. The vertical partition plate 71 located at the front side is disposed between the upper and lower fuses 80 in the front row. The vertical partition plate 71 located at the rear side is disposed between the upper and lower fuses 80 in the rear row. The two vertical partition plates 71 are continuous with the two side ground walls 70 of the ground surrounding wall 68.

As shown in FIG. 9, the fuse receptacle 64 includes fuse fastening nuts 72 that fasten the fuses 80. The fuse fastening nuts 72 are disposed to be coaxial with the lead fastening holes 83 of the two lead portions 82 of the four fuses 80. The fuse fastening nuts 72 are embedded into the fuse receptacle 64 through insert molding.

FIG. 9 shows two of the four first bus bars 51 each having the fuse fastening portion 53 disposed between upper ones of the fuse fastening nuts 72 and the walls defining the lead fastening holes 83 in the fuses 80. Although not shown in the drawing, the remaining two first bus bars 51 each have the fuse fastening portion 53 disposed between lower ones of the lower fuse fastening nuts 72 and one of the lead portions 82 of the fuses 80. Fuse fastening bolts 93 are inserted through the fastening holes of the fuse fastening portions 53 of the first bus bars 51 and the lead fastening holes 83. The fuse fastening bolts 93 engage the fuse fastening nuts 72 embedded into the fuse bodies 81. Thus, the four first terminals 20 and the four fuses 80 are electrically connected via the first bus bars 51. As described above, the four first terminals 20 are separately connected to the four fuses 80 with corresponding different ones of the four first bus bars 51. This eliminates the need for typical wires connecting multiple terminals to multiple fuses. Thus, the number of components is reduced. Also, a typical task of connecting multiple terminals to multiple fuses with wires does not have to be performed. Thus, the amount of assembly work is reduced.

As shown in FIG. 9, a first eyelet terminal 90 is fastened to the lead fastening hole 83 in a further one of the lead portions 82 of each fuse 80. The first eyelet terminal 90 includes a first eyelet terminal fastening portion 91 and a first wire crimping portion 92. A fastening hole is open in the first eyelet terminal fastening portion 91. The first wire crimping portion 92 is of an open barrel type and is connected to the conductive core of a wire 110 through crimping. A fuse fastening bolt 93 is inserted into the lead fastening hole 83 in the further one of the lead portions 82 of the fuse 80 and the first eyelet terminal fastening portion 91. The fuse fastening bolt 93 engages the fuse fastening nut 72 embedded into the fuse body 81. This electrically connects the fuse 80 and the first eyelet terminal 90. Although not shown in the drawings, the wire 110 connected to the first wire crimping portion 92 is connected to a vehicle device side.

Figure 4:
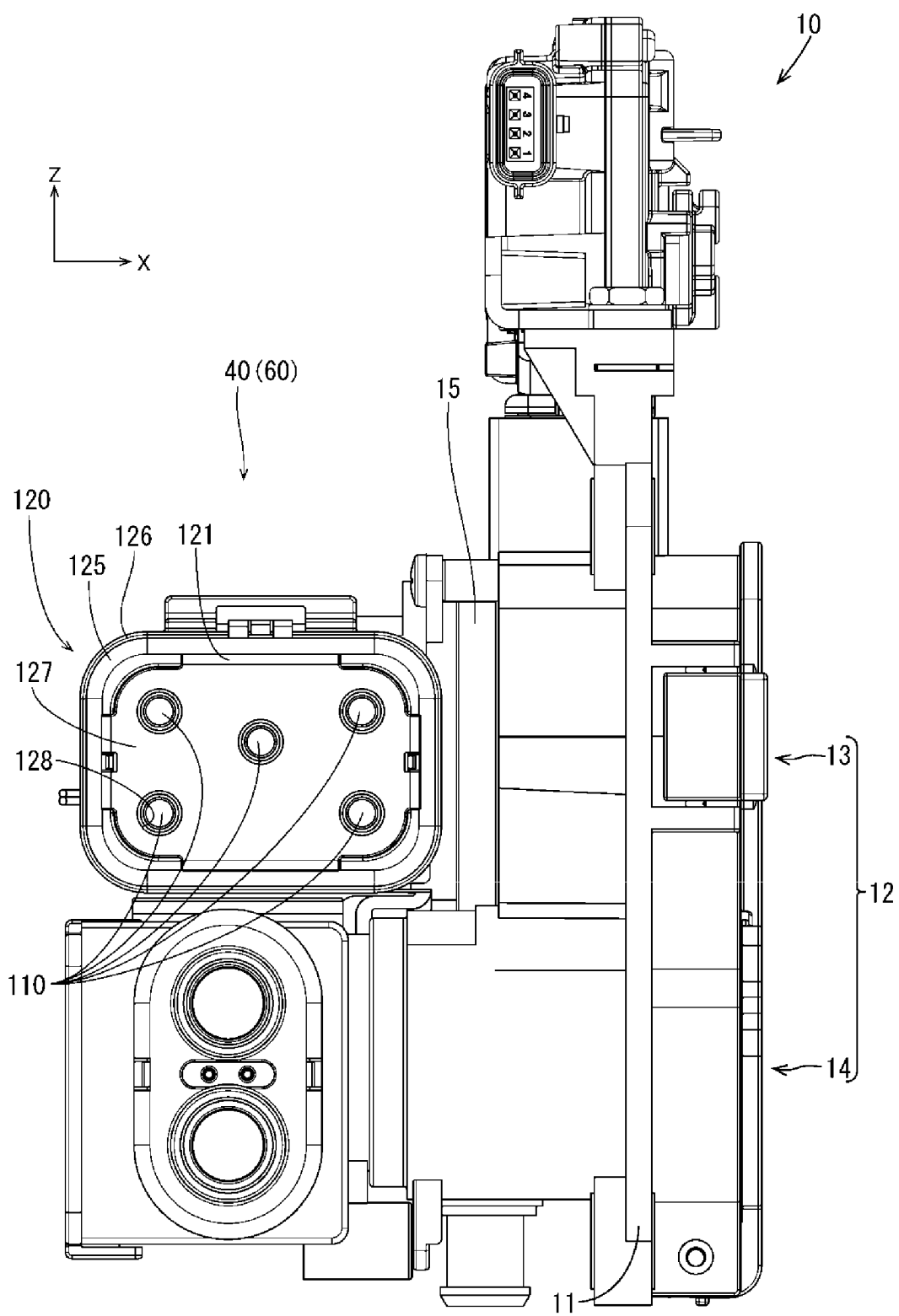
FIG. 4 is a left view of the charging inlet.

As shown in FIGS. 1 and 4, the fuse cover 120 includes a cover body 121 having the shape of a tetragonal plate having round corners and a hood portion 125 that is hood-shaped and open from the cover body 121 toward the left side. As shown in FIG. 9, the fuse cover 120 is attached from the right side of the fuse receptacle 64 to cover the fuse receptacle 64.

The cover body 121 includes cover-side wire through holes 122 that are open to allow insertion of four wires 110 connected to four first eyelet terminals 90 and one wire 110 connected to the second eyelet terminal 100. As shown in FIG. 9, rubber ring receptacles 123 project from the open edges of the cover-side wire through holes 122 toward the right side. The rubber ring receptacles 123 accommodate separate rubber rings 124. The separate rubber rings 124 prevent entrance of water into the fuse receptacle 64 from the right side.

As shown in FIG. 9, when the fuse cover 120 is attached, the inner surface of a distal end 126 of the hood portion 125 is in contact with the seal member 63 attached to the collective seal 62. This collectively seals the four fuses 80, which are separately accommodated in the fuse receptacle 64 of the fuse box 60. Thus, the number of seal members is reduced as compared to a typical configuration in which a separate seal member is attached to each fuse 80.

As shown in FIG. 9, a cover-side retainer 127 is attached from the right side of the fuse cover 120. As shown in FIG. 4, the cover-side retainer 127 includes retainer-side wire through holes 128 that are open to allow insertion of the four wires 110 connected to the four first eyelet terminals 90 and the one wire 110 connected to the second eyelet terminal 100. The open edges of the retainer-side wire through holes 128 are in contact with the separate rubber rings 124. This prevents the separate rubber rings 124 from separating from the rubber ring receptacles 123 toward the right side.

As described above, in the present embodiment, the multiple first terminals 20 are connected to the multiple fuses 80 with the first bus bars 51. This eliminates the need for typical wires connecting multiple terminals to multiple fuses. Thus, the number of components is reduced. Also, a typical task of connecting multiple terminals to multiple fuses with wires does not have to be performed. Thus, the amount of assembly work is reduced.

The seal member 63 is disposed between the inner surface of the fuse cover 120 and the outer surface of the fuse box 60 to collectively seal the multiple fuses 80 separately accommodated in the fuse box 60. The number of seal members 63 is reduced as compared to a typical configuration in which the seal members 63 are separately attached to each fuse 80.

The techniques disclosed in the present description are not limited to those described in the embodiment with reference to the drawings and may, for example, include various modes described below.

In the present embodiment, the joint portion 50 projects from the side surface of the accommodation box body 41 toward the right side, and the fuse box 60 projects from the right end of the joint portion 50 toward the right side. However, the joint portion 50 and the accommodation box body 41 may project in other directions and may project, for example, toward the rear side.

In the present embodiment, the number of power-side first terminals 20 is four, and the number of fuses 80 is four. However, the number may be any number that is one or greater.

In the present embodiment, the charging inlet 10 is of an integration type of normal charging and fast charging. Instead, a charging inlet for only normal charging or for only fast charging may be used.

DESCRIPTION OF THE REFERENCE CHARACTERS 10) charging inlet
12) inlet body
20) first terminal (terminal)
40) accommodation box
41) accommodation box body
43) first body receptacle (body receptacle)
51) first bus bar (bus bar)
60) fuse box
63) seal member
80) fuse
120) fuse cover

The invention claimed is:

1. A charging inlet, comprising:
an accommodation box, the accommodation box including multiple terminals, an accommodation box body separately accommodating the terminals, multiple fuses, a fuse box integrated with the accommodation box body and separately accommodating the fuses, and multiple bus bars respectively electrically connecting the terminals to the fuses; and
an inlet body to which the accommodation box is attached from a rear side, wherein
the accommodation box body has a circular columnar shape and extends in a front-rear direction,
the accommodation box includes multiple body receptacles that are open in a front end surface of the accommodation box to separately accommodate the terminals,
the terminals accommodated in the body receptacles project from a front end surface of the accommodation box body, and
the bus bars are insert molded components that are embedded into the accommodation box through insert molding.

2. The charging inlet according to claim 1, further comprising:
a fuse cover covering the fuse box; and
a seal member disposed between an inner surface of the fuse cover and an outer surface of the fuse box to collectively seal an inner portion of the fuse box.

3. A charging inlet, comprising:
an accommodation box, the accommodation box including multiple terminals, an accommodation box body separately accommodating the terminals, multiple fuses, a fuse box integrated with the accommodation box body and separately accommodating the fuses, and multiple bus bars respectively electrically connecting the terminals to the fuses;
an inlet body to which the accommodation box is attached from a rear side;
a fuse cover covering the fuse box; and
a seal member disposed between an inner surface of the fuse cover and an outer surface of the fuse box to collectively seal an inner portion of the fuse box, wherein the accommodation box body has a circular columnar shape and extends in a front-rear direction, the accommodation box includes multiple body receptacles that are open in a front end surface of the accommodation box to separately accommodate the terminals, the terminals accommodated in the body receptacles project from a front end surface of the accommodation box body, and the bus bars are embedded into the accommodation box.

* * * * *